United States Patent Office 3,718,891
Patented Feb. 27, 1973

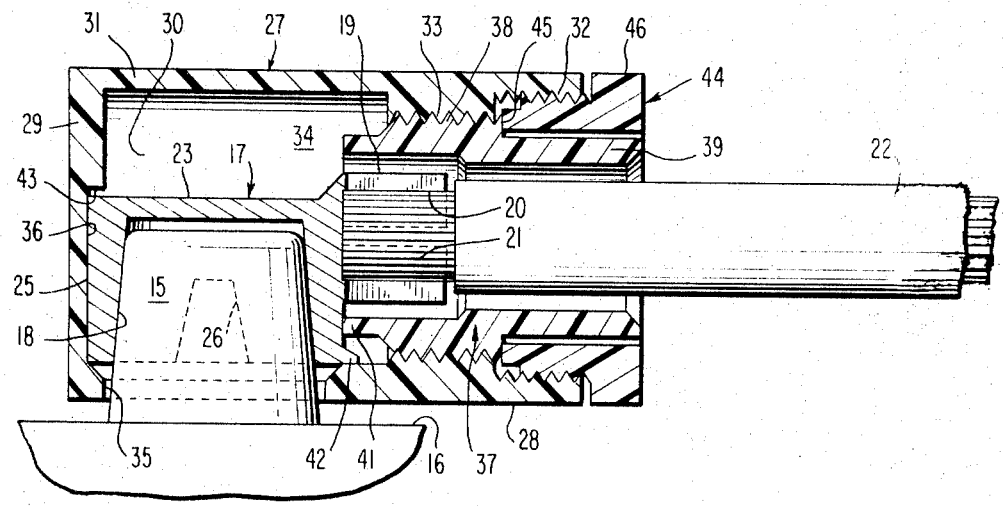
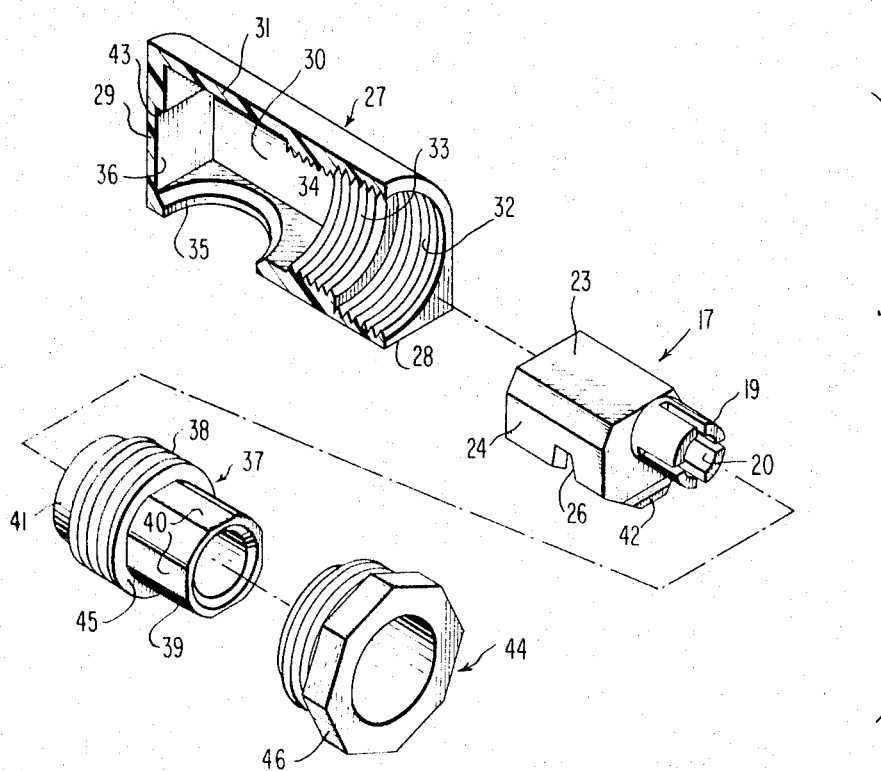

3,718,891
BATTERY TERMINAL CONNECTOR AND HOUSING MEANS
Richard R. Wening, 2113 N. Eastside,
Santa Ana, Calif. 92701
Filed June 21, 1971, Ser. No. 154,737
Int. Cl. H01r 11/26
U.S. Cl. 339—116 R                   10 Claims

ABSTRACT OF THE DISCLOSURE

A battery terminal post receives thereon a connector cap formed of a similar metal to avoid electrolysis and corrosion. The terminal post and cap are received within a non-metallic corrosion-resistant housing and the housing in turn receives a threaded sleeve for applying clamping pressure to the connector cap and a locking nut to prevent movement of the sleeve. The housing, connector cap and pressure-applying sleeve have interfitting parts which resist movement of the cap while the sleeve is being tightened and thereafter.

BACKGROUND OF THE INVENTION

Corrosion-resistant battery terminal connectors are known in the prior art and have taken a number of different forms. None of the prior art connectors has received wide acceptance commercially for a number of reasons. Some of the proposed devices have proven to be prohibitively complex and costly and therefore impractical to manufacture. Other proposed constructions have been non-compatible with conventional storage batteries and battery terminals and would require actual modification of the battery, which is generally unacceptable. Still other proposals have not been sufficiently effective in the primary aim of preventing terminal corrosion, oxidation and short-circuiting caused by foreign metal objects.

In spite of the above, there is a definite need for a simplified, economical and wholly reliable battery terminal connector which will resist corrosion and oxidation and which will be applicable to the many standard forms of storage batteries presently used in automobiles and many other similar applications including boats, golf carts and tractors, to name but a few. The objective of this invention is, therefore, to satisfy the obvious need for such a device and in so doing to significantly improve upon the prior art proposals which have not gained acceptance.

The present invention provides a housing structure which substantially encloses the usual upstanding battery terminal post and which may be actually sealed around this post if such precaution is desired. Within the housing structure and immovably locked thereto is a terminal post connector cap formed of the same metal as the post and construction so that the cap may be deformed by a clamping means and thereby forced into tight gripping engagement with the terminal post. The cap clamping means is in the form of a threaded sleeve received within a threaded bore portion of the housing structure on an axis prependicular to the axis of the terminal post. A locking nut or sleeve is also received by the housing to secure the clamping sleeve against displacement due to vibration. The housing structure, connector cap and clamping sleeve all have interfitting components which resist rotation of the cap or axial movement thereof on the terminal post, either during the application of the cap to the post or thereafter when the assembly is installed and fully tightened. The housing structure and the two threaded sleeves are formed of a durable preferably transparent noncorrosive material.

Other features and advantages of the invention will appear to those skilled in the art during the course of the following detailed description.

BRIEF DESCRIPTION OF DRAWING FIGURES

FIG. 1 is a central vertical cross section taken through a battery terminal post and non-corrosive connector means embodying the invention.

FIG. 2 is an exploded perspective view of the invention.

DETAILED DESCRIPTION

Referring to the drawings in detail wherein like numerals designate like parts throughout, the numeral 15 designates one terminal post of a conventional storage battery, said post projecting above the top face 16 of the battery and being formed of antimony lead or the like. A connector cap 17 for the terminal post 15 also formed of antimony lead is provided, and this cap is engageable over the top of the terminal post in snug-fitting relation therewith. The terminal post 15 and the socket opening 18 in the cap are both slightly conically tapered, as shown. The connector cap 17 has a lateral extension 19 on an axis perpendicular to that of the terminal post 15 and this extension has a socket opening 20 adapted to receive the exposed terminal end 21 of an insulated battery cable 22. The tubular extension 19 may in some instances be soldered to the cable terminal 21 or may simply be squeezed or clenched thereabout mechanically, if preferred. The body portion of the cap 17 is essentially rectangular externally and possesses a flat top face 23 and right angular side and end faces 24 and 25. The cap body portion is also preferably notched as at 26 in its opposite sides to facilitate squeezing or clenching of the cap around the post 15 by adjustable clamping means, to be described.

A protective and corrosion-resistant housing 27 for the terminal post 15 and connector cap 17 is provided to shield these elements from contaminants, corrosive agents and foreign particles. The housing 27 is preferably formed of molded polycarbonate, available under the name Lexan or equivalent material. The housing is also preferably transparent for exposing to view the interior electrically connected elements 15 and 17. As shown in the drawings, the housing 27 is somewhat elongated on an axis perpendicular to the axis of the terminal post 15. It includes a flat bottom wall 28 which may lie close to the top face 16 of the battery, a right angular frontal wall 29 and parallel upstanding side walls 30 which blend into a transversely arcuate top wall 31. The end of the housing 27 remote from the wall 29 is open and has a screw-threaded bore 32 leading to a reduced diameter screw-threaded bore 33 axially inwardly thereof. The threaded bore 33 in turn leads into a forward chamber 34 of the housing 27 which receives the connector cap 17 and terminal post when the parts are assembled, FIG. 1. The bottom wall 28 is provided with an opening 35 immediately inwardly of the end wall 29 to receive the terminal post 15 when the assembly is placed downwardly thereover.

The interior of the frontal wall 29 is recessed at 36 to provide a flat surface which abuts with the flat end face 25 of connector cap 17. The lower side of the cap 17 lies parallel to the bottom wall 28 of the housing and may substantially contact the interior face of the bottom wall after being pressed downwardly onto the terminal post 15, FIG. 1.

The device additionally comprises a clamping or pressure sleeve 37 which has external screw-threads 38 near its leading end and a trailing somewhat reduced diameter tubular portion 39. This tubular portion 39 of the clamping sleeve has circumferentially spaced external wrench flats 40 which project beyond the open end of the housing 27 to facilitate tightening the clamping sleeve when its screw-threads 38 are engaged within the threaded bore 33 of the housing, as shown in FIG. 1. At its leading end, the clamping sleeve 37 has a relatively narrow annular lip or projection 41 which directly contacts the rear side of the partially split cap 17 for forcing the same tightly against the terminal post 15. As the clamping sleeve 37 is tightened into the housing 27, the flat faces 25 and 36 will also be pressed tightly together and as a consequence the forward section of the partially split cap 17 will be forced into tight engagement with the terminal post 15 to assure a positive electrical and mechanical connection between the two critical lead elements 15 and 17. The cap 17 is additionally provided at its rear side and bottom with a straight transverse lip or rib 42 which engages under the projection 41 to lock the cap 17 against upward displacement from the terminal post 15. A transverse edge shoulder 43 produced by the formation of the recess 36 overlies the top of the cap 17 and also prevents upward displacement thereof when the parts are assembled. The previously-described rectangular configuration of the cap 17 and the abutment of the flat faces 25 and 36 locks the connector cap against rotation around the axis of the terminal post 15. When the sleeve 37 is fully tightened into engagement with the cap 17, the latter will be tightly clenched to the terminal post 15 around substantially the entire circumference of the post and the bore of the cap. The extension 19 of the connector cap now lies within the bore of clamping sleeve 37 and the battery cable 22 also extends through and beyond the sleeve 37 to the exterior of the assembly.

In order to assure that vibration will not loosen the clamping sleeve 37 and consequently the battery terminal connector, an externally screw-threaded locking sleeve 44 is provided for engagement within the threaded bore 32, as shown. The leading end of the locking sleeve 44 engages a shoulder 45 of the sleeve 37 so as to form a thread lock therewith. The locking sleeve fits telescopically over the tubular portion 39 and has a wrench-engageable head 46 on its outer end to facilitate tightening. The two elements 37 and 44 are also preferably formed from molded transparent polycarbonate or equivalent material.

In assembling the device, the connector cap 17 after being applied to the end of the cable 22 is introduced with the cable through the open end of the housing 27 along an axis perpendicular to that of the terminal post 15. The clamping sleeve 37, after being slipped over the cable previously, is also introduced into the threaded bore 33 but not completely tightened so as to be initially clear of engagement with the cap 17. The locking sleeve 44 is also loosely introduced into the threaded bore 32. The entire loose assembly, consisting of the housing 27, connector cap 17 and the two sleeves 37 and 44, is now placed over the terminal post 15, the latter entering through the bottom opening 35 and engaging within the tapered socket 18 of the connector cap. The assembly may be pressed downwardly to wedge the tapered post 15 into the cap and the shoulder 43 acting on the top of the cap 17 will assist in pressing the parts together. Following this, the clamping or pressure sleeve 37 is fully tightened utilizing a suitable wrench and its leading extension 41 together with the opposing force of the recess 36 will squeeze and clench the somewhat deformable cap 17 into firm electrical and mechanical contact with the battery terminal post 15 where it will remain so held by the sleeve 37. As previously stated, the connector cap 17 is now positively held against displacement in all directions. Finally, the locking sleeve 44 is tightened to lock the threads of the clamping sleeve 37 with the threaded bore 33 of the housing 27 so that even severe vibrations will not loosen the assembly.

Certain changes in the configuration of the cap 17 may be resorted to in some cases to accommodate various types of battery terminal posts but the overall arrangement of the assembly will remain as shown and described. While the invention has been illustrated and described particularly in connection with storage battery terminals, it will be understood that the principle is applicable to many other forms of electrical and mechanical connections where corrosion, oxidation and other contaminating influences are undesirable and should be excluded. The device is characterized by simplicity and economy of construction, ease of assembly, ruggedness and durability. It is highly reliable in producing the desired anti-corrosion connection with a storage battery terminal. The many advantages of the invention should now be apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. A connector assembly for electrical terminal posts comprising a connector cap adapted to engage over a terminal post for forming an electrical connection therewith, said cap adapted for connection with a cable on an axis generally perpendicular to the axis of said post, a corrosion-resistant housing for said post and connector cap having a bottom opening engageable over the post so that the post may enter a socket recess in the connector cap while said recess is aligned with said bottom opening, said housing having a main bore on an axis generally perpendicular to the axis of said bore on an axis generally perpendicular to the axis of said bottom opening, said main bore receiving said connector cap and adapted to receive a cable secured to said cap, said main bore having screw-threaded portions, a tubular clamping sleeve having screw-threads engaged with one screw-threaded portion of the main bore and having a leading end engaged with said connector cap to clamp the cap in firm engagement with said post, said housing having an end wall opposed to the clamping sleeve and reacting on said cap to clamp it in firm engagement with said post, and a tubular locking sleeve having screw-threads engaged with another threaded portion of said main bore and engaged with the clamping sleeve to lock the same against vibration, said clamping and locking sleeves interfitting telescopically.

2. The structure of claim 1, and said housing, clamping sleeve and locking sleeve formed of corrosion-resistant non-metallic material.

3. The structure of claim 2, and said material comprising transparent polycarbonate.

4. A connector assembly for an electrical terminal post comprising a connector cap formed of a metal similar to the material of said post and having a bottom opening socket recess receiving the top of said post snugly, said cap being at least partly divided so as to render it deformable under pressure, a non-metallic corrosion-resistant housing for said terminal post and connector cap and having a main bore on an axis approximately at right angles to the axis of the terminal post, one end of said main bore being open and there being an end wall on the housing at the opposite end of the main bore and near the terminal post, said end wall and connector cap having opposed abutting flat faces to resist rotation of the cap relative to the terminal post, means forming a shoulder on the housing above the connector cap resisting upward displacement of the cap from the terminal post, said main bore of the housing being at least in part screw-threaded, and a lockable tubular clamping sleeve in the main bore having screw-threaded engagement with the threads of the main bore and having a leading end engaging the side wall of said cap and applying clamping pressure thereto to clench the cap into binding engagement with said terminal post.

5. The structure of claim 4, and a projecting rib on the rearward side of the connector cap adapted to interlock beneath a leading projection on said lockable clamping sleeve to resist upward displacement of the cap from said post.

6. The structure of claim 5, and a separate screw-threaded locking sleeve for said clamping sleeve and adapted to engage a shoulder formed on the clamping sleeve to lock the latter and having screw-threaded engagement with the threads of said main bore.

7. The structure of claim 6, and said clamping sleeve and locking sleeve each having wrench-engageable flats formed thereon.

8. The structure of claim 6, and the threads of said main bore formed on stepped diameter portions of the main bore, said clamping sleeve engaging the smaller diameter threads of the main bore, and said locking sleeve engaging the larger diameter threads and engaging telescopically over an extension of the clamping sleeve.

9. A connector assembly for a battery terminal post or the like comprising a connector cap adapted to engage frictionally over a terminal post, said cap also adapted for connection with a cable extending generally perpendicular to said post, a housing element for said post and connector cap having a bore opening through one end of the housing element and having a bottom opening intersecting said bore and adapted to fit over said post, said housing element having an end wall remote from the open end of said bore and abutting one side of said cap, a cap clamping element insertable into said bore of the housing element and abutting an opposite side of said cap, and means engageable with the housing element and locking said clamping element within said bore of the housing element, said clamping element and said means to lock the clamping element comprising a pair of coaxial screw-threaded sleeves, said bore having screw-threaded portions receiving said sleeves.

10. A connector assembly for a battery terminal post comprising a connector cap formed of metal similar to the material of a battery terminal post, said cap having a bottom socket opening and being at least partly divided circumferentially, a non-metallic corrosion-resistant housing for said connector cap having a main bore adapted to receive the cap bodily and having a bottom opening coaxial with the cap socket opening when the cap is assembled inside of the housing, one end of said main bore being open, said housing having an end wall remote from said open end of the main bore positively contacting a side wall portion of the cap when the cap is in assembled relation to a terminal post, means forming a substantially horizontal ledge within the housing above said cap to resist upward displacement of the cap in the housing, said main bore of the housing being at least in part internally screw-threaded, and a clamping sleeve engaging threadably in the main bore and having a leading end positively contacting an opposite side wall portion of the cap and applying pressure thereto in opposition to said housing end wall, said clamping sleeve and housing extending coaxially with said cap beyond one side only of a battery terminal post to which said connector assembly is applied.

References Cited

UNITED STATES PATENTS

| | | | |
|---|---|---|---|
| 3,152,854 | 10/1964 | Osborn | 339—116 R X |
| 2,925,579 | 2/1960 | Osborn | 339—116 R X |

RICHARD E. MOORE, Primary Examiner

U.S. Cl. X.R.

339—237, 202